Oct. 8, 1963 W. L. MORRISON 3,106,307
INSULATED CONTAINER
Filed Aug. 3, 1960
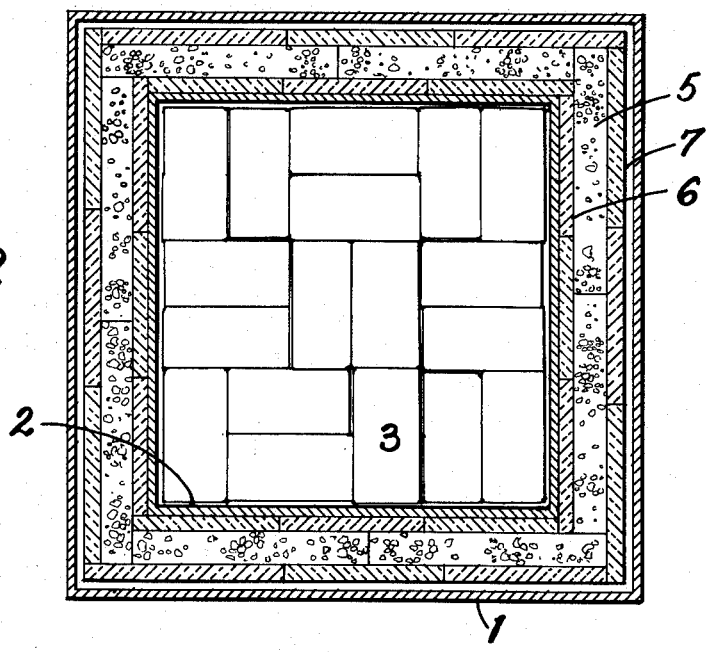
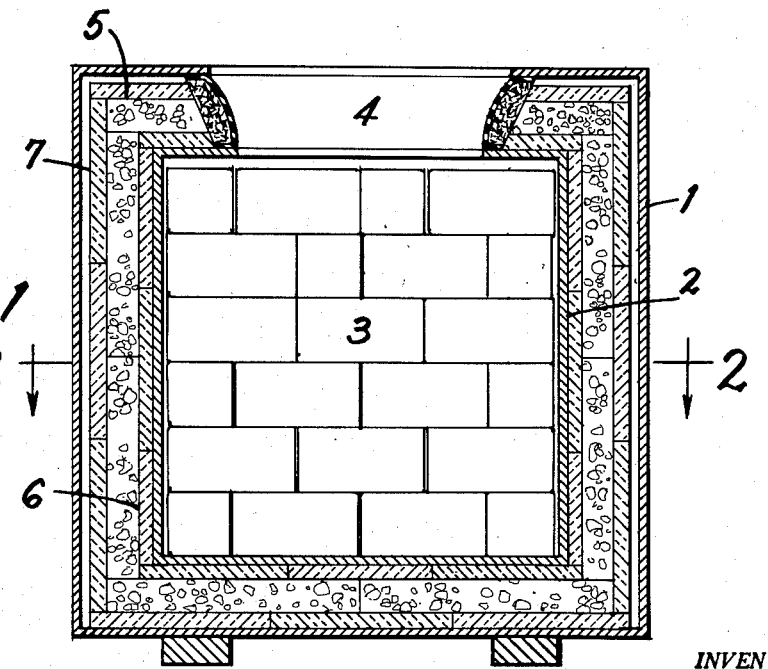
INVENTOR.
WILLARD L. MORRISON
BY PARKER & CARTER
ATTORNEYS 3,106,307
INSULATED CONTAINER
Willard L. Morrison, Lake Forest, Ill., assignor to Liquefreeze Company, Inc., New York, N.Y., a corporation of New York
Filed Aug. 3, 1960, Ser. No. 47,224
9 Claims. (Cl. 220—9)

This invention relates to improvements in insulation and has for one object to provide a multi-stage insulation which has maximum efficiency and does not suffer as a result of excessive temperature changes.

Foamed plastic panels of polyurethane containing Freon gas are well known to provide exceptionally effective insulation because the Freon gas is an exceedingly effective insulator. However, this Freon at atmospheric pressure liquifies at −40 degrees F. so if such a polyurethane panel is cooled down below −40 degrees F., the gas liquefies, vacuums are formed in the beads and air penetration results, thus decreasing the effectiveness of the insulation. Then when the temperature rises and the Freon boils and becomes again a gas, it is mixed with air so its insulation effect is diluted. If there are several changes in temperature above and below −40 degrees F., this breathing of air will very soon greatly decrease the insulation effect of the polyurethane.

A polystyrene on the other hand, which contains air while not as good an insulator as Freon laden polyurethane, is much cheaper. Air is a better conductor than Freon and remains a gas down to below −320 degrees F. Temperatures far below −40 degrees F. do not have any deleterious effect on such polystyrene and it remains just as good an insulation as it was before such low temperatures were met.

It is proposed to take advantage of the different characteristics of two such insulating bodies by using them in combination, a layer or layers of air laden polystyrene exposed to the cold, protecting an inner layer of Freon laden polyurethane from the extreme cold.

This is especially applicable to containers wherein foodstuff is to be frozen and shipped by the use of liquid nitrogen at atmospheric pressure. A container having a housing wall enclosing a cold chamber is lined with a layer of Freon laden polyurethane panels and an inner layer of air containing polystyrene panels, all the panels being free to expand and contract and move independent of one another and independent of the housing so long as they are held in proper place therein. Then when food is in the cold chamber and liquid nitrogen at −320 degrees F. is poured in wetting the contents of the chamber and the chamber walls, the effect of the said polystyrene insulation is nowise changed. Extreme cold does not damage it but the insulating effect of such polystyrene protects such polyurethane so that the polyurethane does not fall to a temperature as low as −40 degrees F. during the time the liquid nitrogen is present.

As the liquid nitrogen boils from the heat of the food, it is dissipated and discharged as gas from the container. Only enough liquid nitrogen is supplied to lower the temperature to a predetermined desired point and then no further liquid is added. As soon as the liquid has disappeared, the temperature of the food in the container will not be −320 degrees F. but something above that, perhaps −40, −50 or −100 degrees F. The inner surface of said polystyrene panel will be at the minimum temperature but the temperature gradient through such panel will rise so that the temperature at the outer surface adjacent said polyurethane will be above the danger point and thus the polyurethane is protected.

This is a rapid operation. The freezing of the food by liquid nitrogen takes place in a matter of minutes. Nitrogen disappears and there is insufficient time for the temperature gradient to result in deleteriously cooling of the polyurethane and a static temperature condition is reached at which the inner heat flow which is important is from outside ambient air through the polyurethane and the polystyrene to the food.

It is this static temperature condition which is so important because in actual practice, foodstuffs cooled by the liquid nitrogen must be shipped or stored for long periods without rising to a danger temperature and it is during that time that the insulation qualities of the polyurethane are so important.

We thus have two conditions to guard against. We need to use said polystyrene, a relatively inefficient insulation but one which does not suffer from excessive cold to protect said polyurethane and then later, we need to use said polyurethane, a very efficient insulation, plus the polystyrene to protect the contents from ambient heat from the outside.

Since containers of this kind are shipped all over the country, in fact all over the world, it can also happen that they are exposed on the outside to wide extremes of temperature. The container may be subjected to ambient temperatures in the order of −40 degrees F. or lower in Canada and United States or other parts of the world. Such temperatures, just like the temperatures of the liquid nitrogen, will have a deleterious effect on the gas which liquefies at such low temperatures. Under some circumstances therefore, it is desirable to have not two but three layers, an outside layer and an inside layer, for example of said polystyrene with a central layer of the more effective insulation, said polyurethane.

These layers or panels may be continuous panels or they may be separate blocks. They must be free to warp, to expand and contract with respect to each other and with respect to the outer wall and inner lining of the container so that no matter how they expand and contract they will not tear themselves apart, will not damage each other and will maintain a generally continuous wall of insulation. The panels may be held together edge to edge by springs as shown in my co-pending application Serial No. 784,662, filed January 2, 1959, now Patent No. 3,029,957, and the clearances between the panels and the walls of the housing may be filled with flowing, discrete, pulverulent material as shown in my co-pending applications Serial No. 775,506, filed November 21, 1958, now Patent No. 2,969,154, and Serial No. 770,068, filed October 30, 1958, now Patent No. 2,933,116.

Other objects will appear from time to time throughout the specification and claims.

My invention is illustrated diagrammatically in the accompanying drawing, wherein—

FIGURE 1 is a vertical section through a shipper container;

FIGURE 2 is a section along the line 2—2 of FIGURE 1.

The cold storage shipper container includes an outer wall 1, an inner lining wall 2, the latter defining a cold storage chamber in which packages 3 of food to be stored or shipped are packed. The chamber is ported at 4. The details of the port, forming no part of the invention, are not illustrated.

In the space between the walls 1 and 2 is an insulating body which is loosely socketed therein. That insulating body includes slabs of self-supporting, relatively stiff, insulating material 5, for example, Freon laden polyurethane. Both inside and outside of this slab of polyurethane are slabs 6 and 7 of air containing polystyrene. These slabs are arranged edge to edge and are loosely contained within the space between the walls 1 and 2 and are free to change size and shape in response to temperature variations.

The inner and outer polystyrene slabs are thinner than the polyurethane slab and the joints between the slabs are staggered.

This container is intended for use in connection with the cooling, storage and shipment of food and is especially intended for use in connection with the situation where the food is frozen by pouring into the container after the food is packed in it, a flow of liquid nitrogen at atmospheric pressure and temperature of —320 degrees F., which nitrogen will, as it cools the food, tend to cool the insulation.

Such containers are also used for shipment where they are subjected to very low ambient temperatures even below —40 degrees F. and the ambient temperature tends to cool the insulation.

The polyurethane is a foamed plastic which contains gaseous Freon. The polystyrene is a foamed plastic which contains air. Freon is a much more effective insulator than air so polyurethane with Freon is a much more effective insulation body than polystyrene with air. Also, of course, such polyurethane is more expensive but polyurethane has one disadvantage. The Freon becomes a liquid at approximately —40 degrees F. When it liquefies, it creates a vacuum and the vacuum may cause air infiltration into the body of the plastic. When later the Freon evaporates again there is a mixture of Freon and air present and as a result the refrigeration quality of the polyurethane is decreased. Every time polyurethane is exposed to —40 degrees F. temperature, it may breathe and gradually and progressively lose its insulation advantage over polystyrene.

It is to protect this polyurethane against the excessive cooling that I provide the layer or layers of air containing polystyrene so that even though the outside face of the polystyrene is exposed to temperatures which would harm the polyurethane, the temperature gradient through polystyrene would be such that the polyurethane would be protected.

If it is known in advance that the container will not be exposed to outside temperatures in the order of —40 degrees F., then the outer layer of polystyrene could well be omitted.

The reason why the outer layers of polystyrene are thinner than the layers of polyurethane is to minimize distortion of the slab exposed to greatest temperature variation. A thin layer of the foamed plastic insulation warps less than a thick one. A thin layer is much less likely to fracture itself than a thick one so by providing thin layers of polystyrene to protect the relatively thick layer of polyurethane, an effective combination of the two different types of insulation is achieved.

Polystyrene and polyurethane have been suggested because they are well known, useful types of insulation. The point is that I have two kinds of self-supporting, independent insulating bodies having different characteristics. One is more effective than the other under ordinary circumstances but is subject to deterioration. The other is not so effective but it does not deteriorate so what I propose to do is to use the less expensive, less effective, more insensitive insulation as a shield to protect the more expensive, more effective, more sensitive insulation.

These two foamed plastics are cited as illustrative of a situation where one type of insulation is more effective, under some circumstances, than the other but is subject to deterioration and may be protected by the other type.

I claim:

1. In combination a plurality of separate independent foamed plastic insulation panels arranged side by side in loose contact with one another, free to move, expand, warp and contract independent of each other responsive to temperature variation, one panel comprising air laden polystyrene, another panel comprising Freon laden polyurethane, the polystyrene panel being on the side of the assembly expected to be exposed to lowest temperature.

2. In combination a plurality of separate independent foamed plastic insulation panels arranged side by side in loose contact with one another, free to move, expand, warp and contract independent of each other responsive to temperature variation, a panel on the side of the assembly expected to be exposed to lowest temperature containing a gas which at atmospheric pressure remains in gaseous phase down to temperatures as low as —320 degrees F., another panel on the side of the assembly expected to be exposed to warmer temperature containing a gas which at atmospheric pressure liquefies at temperatures above —320 degrees F.

3. In combination a plurality of separate independent foamed plastic insulation panels arranged side by side in loose contact with one another, free to move, expand, warp and contract independent of each other responsive to temperature variation, one panel containing air, another panel containing Freon in gaseous phase, the panel containing air being on the side of the assembly expected to be exposed to the lowest temperature.

4. In combination three separate, independent, foamed plastic insulation panels arranged side by side in loose contact with one another, free to move, expand, warp and contract independent of each other in response to temperature variation, the central one of the three panels containing Freon in gaseous phase, the other two panels containing air.

5. In combination three separate, independent, foamed insulation panels arranged side by side in loose contact with one another, free to move, expand, warp and contract independent of each other in response to temperature variation, the central one of the three panels containing a gas which at atmospheric pressure liquefies at temperatures in the order of —40 degrees F., the other two panels containing a gas which at atmospheric pressure remains in gaseous phase down to the temperature of liquefaction of air.

6. In combination three separate, independent, foamed insulation panels arranged side by side in loose contact with one another, free to move, expand, warp and contract independent of each other in response to temperature variation, the central one of the three panels being of Freon laden polyurethane, the other two panels consisting of air containing polystyrene.

7. In an insulating container, an outer supporting wall enclosing a storage chamber, an insulating lining for the wall loosely held, including inner and outer layers of foamed plastic, the outside layer containing a gas which becomes liquid at atmospheric pressure and temperature in the order to —40 degrees F., the inner layer containing a gas which becomes a liquid at atmospheric pressure and the liquefaction temperature of air, the layers being self-supporting and free, responsive to temperature changes, to expand, contract and change shape independent of each other and of the supporting wall.

8. An insulating container including an outer supporting wall enclosing a storage chamber, an insulating lining for the wall loosely held therein, including an outer layer of polyurethane Freon laden foamed plastic and an inner layer of air laden polystyrene foamed plastic, each layer being self-supporting and free, responsive to temperature changes to expand, contract and change shape independent of each other and of the supporting wall.

9. In an insulating container, an outer supporting wall enclosing a storage chamber, an insulating lining for the wall loosely held, including inner and outer layers of foamed plastic, each layer including a multiplicity of beads, the beads of the outside layer containing a gas which becomes liquid at atmospheric pressure and temperature in the order of −40 degrees F., the beads of the inner layer containing a gas which becomes a liquid at atmospheric pressure and the liquefaction temperature of air, the layers being self-supporting and free, responsive to temperature changes, to expand, contract and change shape independent of each other and of the supporting wall.

References Cited in the file of this patent

UNITED STATES PATENTS

| | | |
|---|---|---|
| 2,054,323 | Holbrook | Sept. 15, 1936 |
| 2,226,699 | Dietrechson | Dec. 31, 1940 |
| 2,485,647 | Norquist | Oct. 25, 1949 |
| 2,552,641 | Morrison | May 15, 1951 |
| 2,779,066 | Gangler et al. | Jan. 29, 1957 |
| 2,969,164 | Morrison | Jan. 24, 1961 |
| 3,032,224 | Shih-Woo Lou | May 1, 1962 |